United States Patent
Pilzweger et al.

(10) Patent No.: US 10,640,115 B2
(45) Date of Patent: May 5, 2020

(54) METHOD OF OPERATING THE POWER TRAIN OF A VEHICLE

(71) Applicant: ZF Friedrichshafen AG, Friedrichshafen (DE)

(72) Inventors: Hans Pilzweger, Neuhaus am Inn (DE); Alexander Stöbich, Wegscheid (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 0 days.

(21) Appl. No.: 16/170,392

(22) Filed: Oct. 25, 2018

(65) Prior Publication Data

US 2019/0126924 A1 May 2, 2019

(30) Foreign Application Priority Data

Nov. 2, 2017 (DE) .......................... 10 2017 219 469

(51) Int. Cl.
*B60W 10/02* (2006.01)
*B60W 10/11* (2012.01)
*B60W 10/184* (2012.01)
*B60W 30/18* (2012.01)

(52) U.S. Cl.
CPC .......... *B60W 30/181* (2013.01); *B60W 10/02* (2013.01); *B60W 10/11* (2013.01); *B60W 2510/182* (2013.01); *B60W 2520/10* (2013.01); *B60W 2710/021* (2013.01); *B60W 2710/1005* (2013.01)

(58) Field of Classification Search
CPC .... B60W 10/02; B60W 10/11; B60W 10/184; B60W 30/181; B60W 30/18109; B60W 2510/182; B60W 2710/1005
See application file for complete search history.

(56) References Cited

U.S. PATENT DOCUMENTS

| 4,658,942 A * | 4/1987 | Kubota | ................... B60T 7/122 137/598 |
| 8,078,369 B2 | 12/2011 | Reith et al. | |
| 2013/0178333 A1 * | 7/2013 | Plath | ..................... B60W 10/11 477/94 |
| 2016/0046281 A1 * | 2/2016 | Nedorezov | ......... F02N 11/0851 701/22 |

FOREIGN PATENT DOCUMENTS

WO 2006/119851 A1 11/2006

* cited by examiner

*Primary Examiner* — Edwin A Young
(74) *Attorney, Agent, or Firm* — Davis & Bujold PLLC; Michael J. Bujold

(57) ABSTRACT

A method of operating a drive-train (1) of a motor vehicle, in particular an agricultural or municipal utility vehicle, having a drive engine (2), a motor vehicle transmission (4) and at least one drive axle (6). A connection between the drive engine (2) and the at least one drive axle (6) of the motor vehicle is separate automatically by way of a function, and a service brake (11) of the motor vehicle has to be actuated for activation of the function. To ensure an appropriate starting gear selection in various operating situations, during the course of the function triggered by a braking process, a brake pressure ($p_{Brems}$), applied during the process, is determined and a starting gear is automatically determined as a function of the brake pressure ($p_{Brems}$).

13 Claims, 3 Drawing Sheets

| $p_{brems}$ [bar] | 0 | 10 | 20 | 30 | 40 | 50 | 60 | 70 | 80 | 90 |
|---|---|---|---|---|---|---|---|---|---|---|
| gear selection | 4-1 | 3-3 | 3-1 | 2-4 | 2-3 | 2-2 | 2-1 | 1-4 | 1-2 | 1-1 |

Fig. 3

METHOD OF OPERATING THE POWER TRAIN OF A VEHICLE

This application claims priority from German patent application serial no. 10 2017 219 469.3 filed Nov. 2, 2017.

FIELD OF THE INVENTION

The invention relates to a method for operating a drive-train of a motor vehicle, in particular an agricultural or municipal utility vehicle, comprising a drive engine, a motor vehicle transmission and at least one drive axle, wherein a connection between the drive engine and the at least one drive axle of the motor vehicle is automatically disconnected by means of a function and wherein, for the activation of the function, a service brake of the motor vehicle has to be actuated.

The invention also relates to a control unit for a drive-train of a motor vehicle, a computer program product and a data carrier with the computer program product on it.

BACKGROUND OF THE INVENTION

In motor vehicles with automated manual transmissions or automatic transmissions, even if an accelerator pedal is not actuated by the driver of the vehicle there is usually some transmission of a drive movement from a drive engine of the motor vehicle to the drive axle or axles of the motor vehicle, which results in forward crawling of the motor vehicle. To bring the motor vehicle to rest, the driver of the vehicle must actively actuate the service brake, but this causes the drive engine to work against the service brake and therefore also increases the fuel consumption.

To avoid higher fuel consumption, in motor vehicles it is known, by means of some particular function, to selectively separate a connection between the drive engine and the drive axle(s) of the motor vehicle and thereby to suppress the forward movement or crawling of the motor vehicle. The activation and deactivation of the function takes place in a manner that depends on the actuation of the service brake. While carrying out the function it is also known, when the connection is disconnected, to shift automatically to a pre-set starting gear of the motor vehicle's transmission, in which gear, when the function is later deactivated by releasing the brake pedal or when a brake pressure of the service brake falls, the motor vehicle can be started off by closing the connection between the drive engine and the drive axle(s). However, the motor vehicle can come to rest in situations in which starting off in the automatically pre-set starting gear is not advantageous. If the motor vehicle has stopped on an incline, the pre-set starting gear which would be favorable for starting off on level ground may be too high for starting off again on the incline. Too high a starting gear can have the result that due to the load, the drive rotational speed of the drive engine falls to a value at which the drive engine stalls. Due to the staffing of the drive engine, especially on an incline, the motor vehicle may find itself in an operating situation that is difficult to control. Moreover, if the motor vehicle is towing a trailer the aforesaid operating situation can become even worse.

WO 2006/119851 A1 discloses a method according to the preamble of the method claim, WO 2006/119851 describes a standstill shift of an automatic transmission by means of which a connection between the drive engine and the at least one drive axle of the motor vehicle is disconnected by means of a function, and a pre-set starting gear is chosen, wherein for the standstill shift to be activated a service brake of the motor vehicle has to be actuated. To avoid the possibility that starting in a pre-set gear should result in an operating situation that is difficult to control, the method according to WO 2006/119851 envisages that if certain boundary conditions exist, which would make the operation of the motor vehicle more difficult, such as starting off on an incline, then the standstill shift is rendered ineffective.

SUMMARY OF THE INVENTION

Starting from the prior art described above, it is now the purpose of the present invention to realize a method for operating a drive-train of a motor vehicle, which enables safe starting of the motor vehicle even under the action of a high driving resistance while maintaining the function for separating the connection between the drive engine and the at least one drive axle.

This objective is achieved from the process-technological standpoint, starting from the steps recited in the claims. From an equipment-technological standpoint the objective is achieved by virtue of the technical features of the independent claims. The respective dependent claims that follow in each case describe advantageous further developments of the invention. Furthermore, a computer program product and a data carrier for the product are the object of further claims According to the invention, in a method for operating a drive-train of a motor vehicle, in particular an agricultural or municipal utility vehicle having a drive engine, a motor vehicle transmission and at least one drive axle, a connection between the drive engine and the at least one drive axle of the motor vehicle is disconnected by means of a function. In this case, to activate the function a service brake of the motor vehicle has to be actuated.

In that way, by means of the function the transmission of drive movement from the drive engine to the at least one drive axle is automatically interrupted, and in this context the connection to one or more drive axles of the motor vehicle is interrupted, in accordance with how many drive axles the motor vehicle has. Accordingly, the function serves to prevent forward crawling of the motor vehicle, and a necessary condition for the automatic initiation of the function is the actuation of the service brake by a driver of the vehicle.

In the context of the invention the drive engine is in particular an internal combustion engine which can be connected to the respective drive axle(s) by way of an interposed starting element, a motor vehicle transmission and a respective axle transmission of the drive axle(s) concerned. The motor vehicle is preferably a municipal or agricultural utility vehicle, in particular such as an agricultural tractor.

The invention is now based on the technical principle that when the function triggered by a braking process is carried out, a brake pressure applied for that purpose, and depending on that brake pressure a starting gear is automatically determined. In the method according to the invention, as a function of the brake pressure determined a starting gear selection is made, which is adapted to an operating situation in which, with reference to the brake pressure determined, the gear is engaged.

Such a design of a method for operating a drive-train has the advantage that in an operating situation in which there is a large driving resistance when the motor vehicle is started, in particular on an incline, the driver of the vehicle is relieved of having to select a starting gear appropriate for the operating situation, which is particularly advantageous in the case of agricultural or municipal utility vehicles. The driver can concentrate fully on starting, particularly when one or even more than one trailer(s) is/are attached to the utility vehicle. In that way the danger of stalling the drive engine due to the selection of a starting gear not appropriate for the operating situation, and the resulting situation which would be difficult to control, is avoided.

In an embodiment of the invention, a pre-set starting gear selection is automatically overridden if a first brake pressure limit value is exceeded. Basically it is possible for the vehicle's driver to preselect a starting gear which should be engaged while or after the function has interrupted the transmission of a drive movement from the drive engine to the at least one drive axle. This preselected starting gear is automatically overridden if the first brake pressure limit value has been exceeded, in order to engage a starting gear appropriate for the operating situation at the time without the vehicle's driver having to do anything, in which gear starting can again take place as soon as an actuating element of the service brake is released or as soon as the brake pressure decreases.

To alert the vehicle's driver that the starting gear selected by him has been overridden, the starting gear determined as a function of the brake pressure can be indicated visually. For this, a display device of the motor vehicle, in particular an operator terminal in agricultural or municipal utility vehicles, can be actuated accordingly.

The automatic selection of the starting gear to be determined is carried out when due to the braking process, the speed of the vehicle is made to fall below a limit value. Preferably, the selection and engagement of the starting gear selected with reference to the brake pressure only take place when the motor vehicle is actually at rest.

In particular, the starting gear can be determined in a motor vehicle transmission designed as an automated synchronous transmission or a partially powershiftable transmission.

A further development of the invention provides that the brake pressure in at least one brake circuit of the service brake system is detected. For example agricultural utility vehicles can have two separate brake circuits, which to reduce a turning circle of the utility vehicle apply brake pressures of different magnitude. It can then be appropriate to determine the brake pressure in both brake circuits, in order to be able to differentiate between a braking process intended to bring the utility vehicle to rest and a braking process carried our in order to reduce the turning circle.

Furthermore, besides the first brake pressure limit value a second brake pressure limit value can be specified, which is higher than the first brake pressure limit value. A brake pressure lower than or equal to the first brake pressure limit value corresponds to a braking process on level ground. If the brake pressure exceeds the first brake pressure limit value but is lower then or equal to the second brake pressure limit value, this corresponds to a braking process on an incline. For further differentiation between a slight incline and a steep incline, a third brake pressure limit value can be defined, which is higher than the second brake pressure limit value. Thus, for the automatic selection of the starting gear after a braking process on level ground, as the preselected starting gear a higher group gear and a lower powershift gear can be chosen. If the brake pressure determined exceeds the first brake pressure limit value but is lower than the second brake pressure limit value, then at least the group gear is automatically reduced by at least one step. The powershift gear can also be reduced if appropriate. If the brake pressure determined exceeds the second brake pressure limit value, which corresponds to a steep incline, then the group gear is automatically reduced by a further step.

In the context of the invention, the limit value for the vehicle's speed and for a first and second brake pressure limit values of the service brake are values that can be parameterized, i.e. they are stored in advance. In this it can be taken into account that the braking behavior of the motor vehicle is influenced by the towing of one or more trailers. Thus, the towing of one or more traders can result in different braking behavior, i.e. in order to bring the motor vehicle and its towed trailer or trailers to a stop a higher brake pressure is required. To take that circumstance into account, a plurality of first and second brake pressure limit values can be stored, each called into play accordingly when the motor vehicle is operated with or without trailers.

In a further development of the invention, it is provided that a selection of the starting gear is carried out with reference to a correlation, stored in a table, between brake pressures and group gears and powershift gears. In the table various values for a detected brake pressure are each associated with a specific combination of a group gear and a powershift gear. A brake pressure of 0 bar then always corresponds to the highest possible starting gear in which the vehicle, with its unloaded weight, can be operated on a level road. As a function of the type of transmission and the type of vehicle, the table can be parameterized freely. The table provides a static correlation between a brake pressure range and a group and powershift gear combination. The correlation can be graded coarsely or finely by selecting the size of the brake pressure range.

In a motor vehicle drive-train the method according to the invention is preferably regulated by a control unit, which in particular is the control unit of a motor vehicle transmission arranged in the drive-train. In this case the control unit is connected to a device for the regulated control of a function for the separation of a connection between a drive engine and at least one drive axle of the motor vehicle. The control unit comprises a device for the automatic selection of a starting gear of the motor vehicle transmission. A function activated in the drive-train by the device brings about a separation of a connection between a drive engine and at least one drive axle of the motor vehicle. For the function to be activated, a service brake of the motor vehicle has to be actuated. When carrying out the function for separating a connection between a drive engine and at least one drive axle of the motor vehicle, which function can be triggered by a braking process, a brake pressure applied for that process can be determined and a starting gear that depends on the pressure can be set automatically.

In this case for an automatic selection of the starting gear a brake pressure in at least one brake circuit of the service brake must exceed a first brake pressure limit value, in order to determine a starting gear as a function of the brake pressure. To obtain the actuation condition and the current brake pressure of the service brake, the control unit is, in particular, connected into a data bus system of the motor vehicle and thereby communicates with other control units and sensors. It is advantageous for the control unit also to contain the device for regulating a function for separating a connection between a drive engine and at least one drive axle of the motor vehicle.

The system according to the invention can also be embodied in the form of a computer program product which, when run on a processor of a control unit, instructs the processor by software means to carry out the associated process steps which constitute the object of the invention. In this connection the object of the invention also includes a computerreadable medium, on which the above-described computer program product is retrievably stored.

The invention is not limited to the indicated combination of features described in the independent claims or the claims dependent upon them. There also exist possibilities for combining individual features with one another, provided that they emerge from the claims, the description given below of a preferred embodiment of the invention, or directly from the figures. References in the claims to the figures by the use of indexes are not intended to restrict the protective scope of the claims.

BRIEF DESCRIPTION OF THE DRAWINGS

An advantageous embodiment of the invention, which is explained below, is illustrated in the figures, which show:

FIG. 3: A table with an example of a correlation between brake pressures and group and powershift gears.

DETAILED DESCRIPTION OF THE PREFERRED EMBODIMENTS

Figure 1:
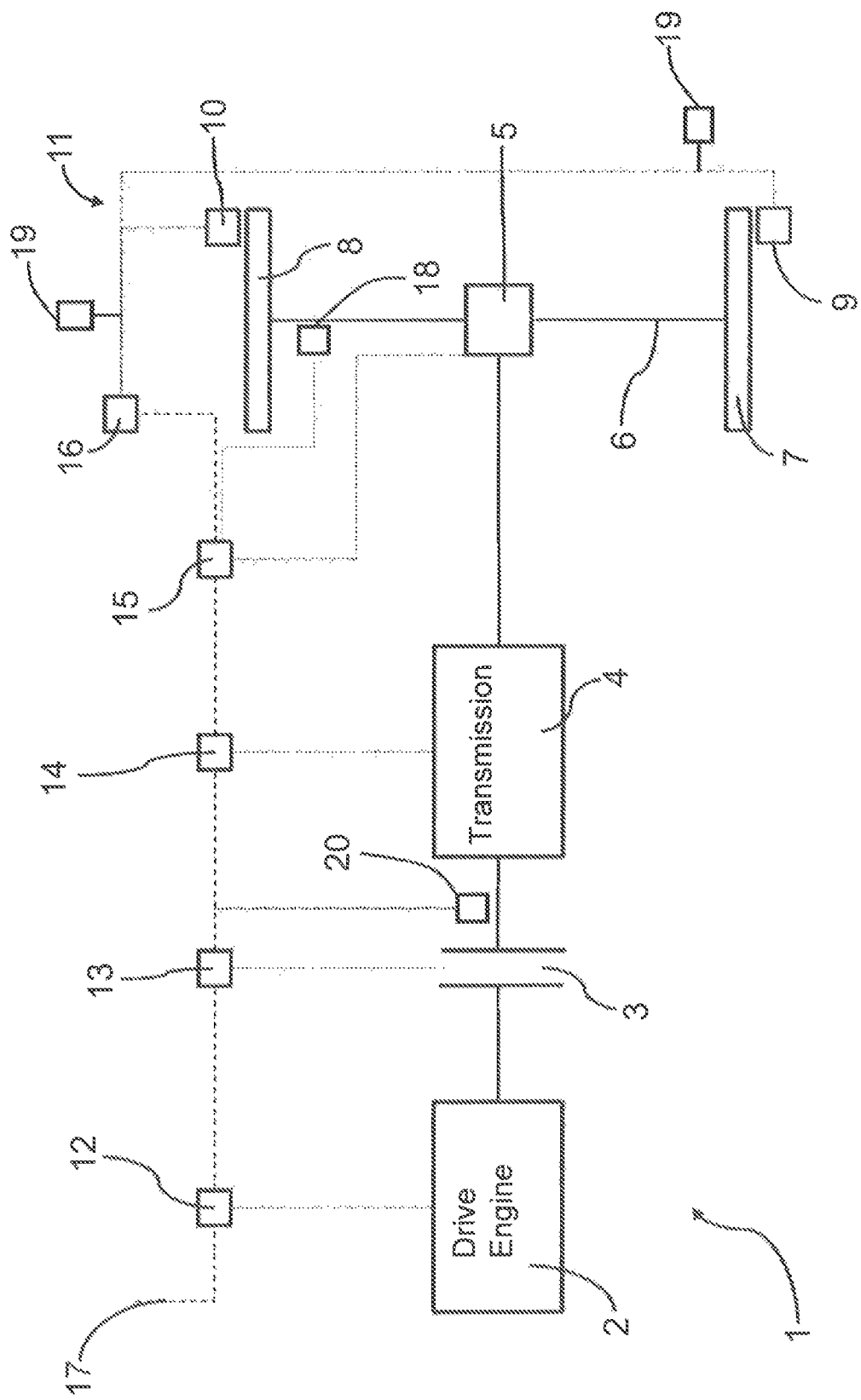
FIG. 1: A schematic view of a drive-train of a motor vehicle.

FIG. 1 shows a schematic view of a drive-train 1 of a motor vehicle, which is preferably an agricultural or municipal utility vehicle and still more preferably a tractor. The drive-train 1 comprises a drive engine 2 in the form of an internal combustion engine which, on a drive output side, can be connected by way of an interposed starting element 3 to a downstream motor vehicle transmission 4. Whereas the starting element 3 is preferably in the form of a dry-running or even wet-running friction clutch, the motor vehicle transmission 4 is in particular a manual transmission, particularly preferably an automated synchronous transmission or a partially powershiftable transmission.

As can also be seen in FIG. 1, on its drive output side the motor vehicle transmission 4 is connected to an axe transmission 5 of a drive axle 6, so that by virtue of the axle transmission 5 drive movement of the drive engine 2, geared by the motor vehicle transmission 4, is distributed to two drive wheels 7 and 8 of the drive axe 6. With each of the drive wheels 7 and 8 is associated a respective wheel brake 9 and 10 of a service brake 11 of the motor vehicle, by the respective actuation of which the drive wheel 7 or 8 concerned is braked. The drive wheels 7 and 8 can also be braked independently of one another in order to increase the maneuverability of the motor vehicle. The service brake 11 comprises at least one brake circuit in which at least one pressure sensor 19 is integrated. By means of the at least one pressure sensor 19, in each case the braking pressure $p_{Brems}$ applied during braking can be detected.

Along with the drive engine 2, the starting element 3, the motor vehicle transmission 4, the axle transmission 5 and also the service brake 11 are in each case associated a respective control unit 12 or 13 or 14 or 15 or 16, which control units are connected to other control units and sensors—not represented further here—with which, and with one another, they communicate by way of a data bus system 17 of the motor vehicle. The control unit 12 regulates the drive engine 2, while by the control unit 13 a function for the automated opening and closing of the starting element 3 can be regulated in order to prevent forward crawling of the motor vehicle. Besides this automated operation of the starting element 3, however, the starting element 3 can also be opened and shut manually as the vehicle's driver wishes, and for that purpose the control unit 13 is connected to a clutch pedal (not shown here).

The control unit 14 is associated with the motor vehicle transmission 4 and can regulate it in the manner of an automated manual transmission, although here too it is possible to carry out shifts in a manual mode in accordance with the vehicle driver's wishes. Moreover, a preselected starting gear can be set by the driver of the vehicle, which after the motor vehicle has been braked to a standstill is engaged automatically by the control unit 14 for restarting by controlling the manual transmission. Finally, the control unit 15 is associated with the axle drive 5 and a rotational speed sensor 18, and the control unit 16 with the service brake 11. The control unit 16 receives signals from a pressure sensor 19 for evaluation, which signals indicate the brake pressure $p_{Brems}$.

Figure 2:
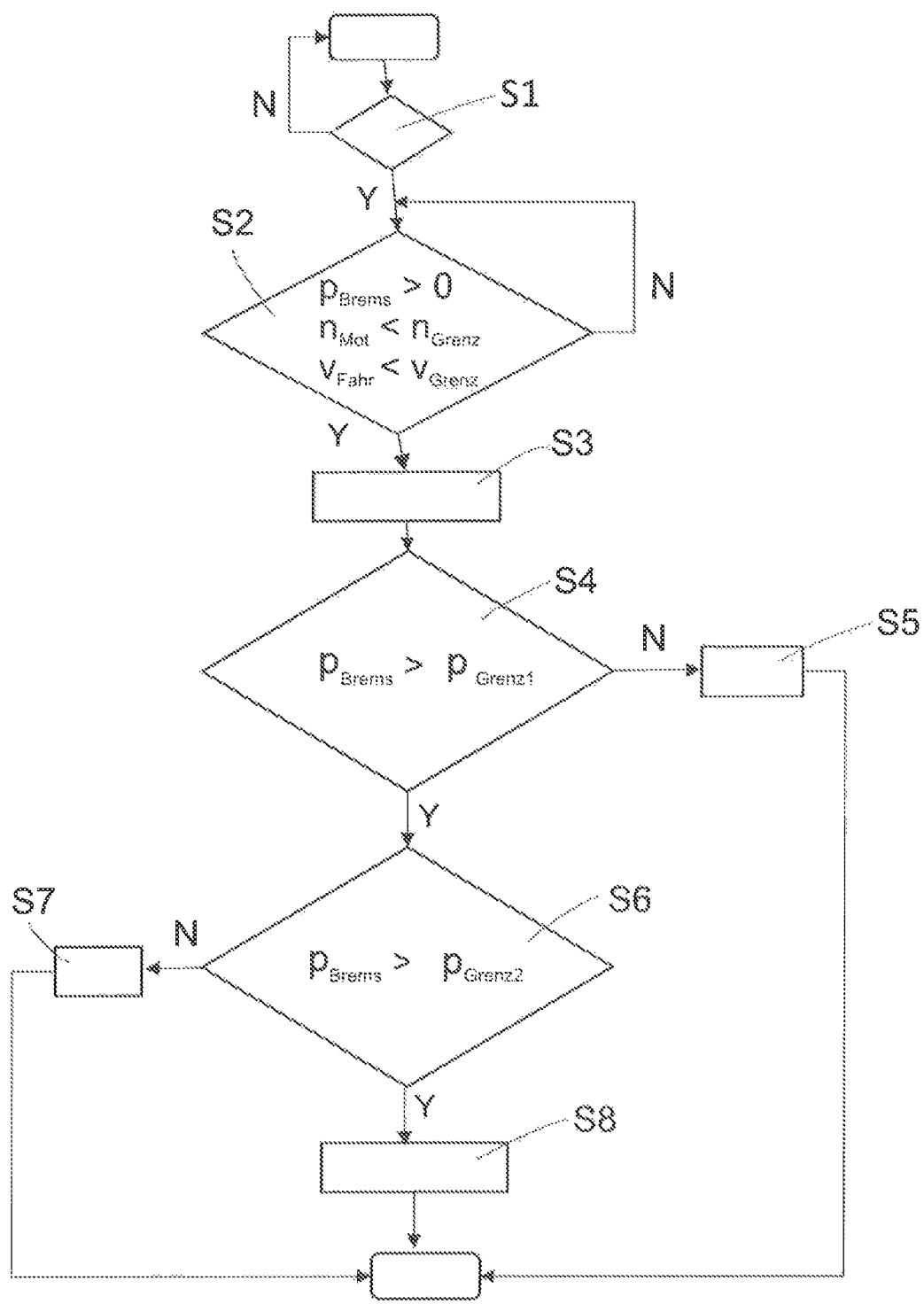
FIG. 2: A flow chart of a method for operating the drive-train of FIG. 1, in accordance with a preferred embodiment of the invention.

As a special feature, by means of the control unit 14 the selection of the starting gear can be determined as a function of the brake pressure $p_{Brems}$ which has been applied in each case for braking the motor vehicle to rest. Depending on the brake pressure $p_{Brems}$ determined in each case the operating situation of the motor vehicle at the time can be deduced, in order to select a starting gear appropriate for the operating situation concerned for restarting. Thus an operating situation can be avoided, in which the drive input rotational speed of the drive engine falls because of the load to a speed which will not enable the operation of the drive engine to be maintained on restarting, which inter alia can happed when restarting on an incline. For that purpose the control unit 14 regulates the motor vehicle transmission 4 in accordance with the method shown in the flow chart of FIG. 2:

At the beginning of the process, in a step S1 it is queried whether the function for the automated opening and closing of the starting element 3 is activated. If not, then the process returns to the beginning and proceeds no farther.

On the other hand, if the result in step S1 is positive, the process advances to a step S2. In step S2 the presence of at least one condition is checked, which is a prerequisite for the automatic opening of the starting element 3. That includes the actuation of the service brake 11, which in any case can be determined, among other things, by monitoring the brake pressure $p_{Brems}$. The actuation or release of the service brake 11 leads to an actuation of brake lights associated with a brake pedal mechanism. The actuation conditions of the two wheel brakes 9 and 10 can be checked with reference to actuation conditions of the respective brake light switch and can be adopted as a further condition which is a prerequisite for triggering the function for opening the starting element 3. In addition, in step S2 it is queried whether a rotational speed $n_{Mot}$ of the drive engine is lower than a rotational speed limit $n_{Grenz}$. A further condition in step S2 is whether a vehicle speed $v_{Fahrz}$ is lower than a limit value $v_{Grenz}$, which triggers the determination of the brake pressure $p_{Brems}$ applied. If all the conditions mentioned are satisfied in step S2, the process advances to a step S3, whereas if not, the process reverts to before step S2.

In step S3 the starting element 3 is automatically opened and the connection between the drive engine 2 and the motor vehicle transmission 4 is disconnected, so that thereafter no forward crawling of the motor vehicle can take place. In addition, in step S3 the brake pressure $p_{Brems}$ and the brake pressure variation applied for braking the motor vehicle until it has come to rest is evaluated by the control unit 16.

In step S4 it is checked whether the brake pressure $p_{Brems}$ has exceeded a first brake pressure limit value $p_{Grenz1}$. If the result in step S4 is negative, then in a strep 35 the motor vehicle transmission 4 is acted upon by the control unit 14 so as to engage a preset starting gear. The preset starting gear corresponds to a gear selection appropriate for restarting on level ground. Thus, as the preset starting gear a higher group gear with a lower powershift gear can be provided. The preset starting gear can be specified by the driver of the vehicle. On the other hand, if the result in step 34 is positive the process advances to a step 36.

In step S6 it is checked whether the brake pressure $p_{Brems}$ has exceeded a second brake pressure limit value $p_{Grenz2}$. If the brake pressure $p_{Brems}$ has not exceeded the value of the second brake pressure limit $p_{Grenz2}$ the process advances to a step 37. If the brake pressure $p_{Brems}$ lies between the first brake pressure limit value $p_{Grenz1}$ and the second brake pressure limit value $p_{Grenz2}$, the control unit 14 interprets this to mean that the motor vehicle has been brought to rest on an incline. On an incline the driving resistance occurring when restarting can result in the preset starting gear chosen being too high, so that due to the load the drive input rotational speed of the drive engine falls to a speed which does not enable the operation of the drive engine to be maintained when restarting. To overcome that situation, in step S7 the preset starting gear is overridden, so that at least the group gear is automatically reduced by at least one step. The powershift gear can if necessary also be reduced.

If the brake pressure $p_{Brems}$ exceeds the second brake pressure limit value $p_{Grenz2}$, the process advances to a step S8. Exceeding the second brake pressure limit value $p_{Grenz2}$ is interpreted by the control unit 14 to mean that the motor vehicle is on a steep incline. The control unit 14 then controls the motor vehicle transmission 4 in such manner that a starting gear an additional step lower compared with step S7 is automatically engaged.

For example, with a brake pressure $p_{Brems}$ below the first brake pressure limit value $p_{Grenz1}$ the starting gear preset is group gear 3 and powershift gear 1, which corresponds to an operating situation of driving the motor vehicle on level ground. If the first brake pressure limit value $p_{Grenz1}$ is exceeded, the preset starting gear is overridden and the starting gear now set is group gear 2 and powershift gear 1. If the brake pressure $p_{Brems}$ also exceeds the second brake pressure limit value $p_{Grenz2}$, then as the starting gear group gear 1 and powershift gear 1 are engaged.

The respective result of the evaluation in step S4 is transmitted from the control unit 16 to the control unit 14, which controls the motor vehicle transmission 4, by way of the data bus 17. In addition the change of starting gear that has taken place as a function of the brake pressure $p_{Brems}$ can be shown to the driver of the vehicle on a display device of the motor vehicle, in particular an operating terminal in the case of agricultural or municipal utility vehicles.

In the control unit 16 various values can be stored for the first brake pressure limit value $p_{Grenz1}$ and for the second brake pressure limit value $p_{Grenz2}$. In that way the operation of the motor vehicle with one or more trailers attached can be allowed for. The brake pressure limit values can be selected as a function of the coupling of one or more trailers. For this, the number of coupled trailers can be specified by the driver of the vehicle or detected automatically by a control unit. Furthermore, more than two brake pressure limit values can be provided.

FIG. 3 shows a table with an example correlation of particular brake pressures $p_{Brems}$ with particular combinations of a group gear and a powershift gear, which are selected as a function of the brake pressure $p_{Brems}$ determined. In the table, in the line "Gear selection" the first number denotes the respective group gear or synchronous gear while the second number stands for the associated powershift gear. The table can be parameterized freely, so that an adaptation of the brake pressure, group gear and powershift gear is possible depending on the transmission and/or the type of vehicle concerned. A brake pressure of 0 bar corresponds to the highest selectable starting gear that enables an unloaded vehicle to start off on level ground. With a brake pressure $p_{Brems}$ detected by the sensors which is in a range higher than 10 bar but smaller than or equal to 20 bar, as the starting gear the combination 3-3 for the group gear and the powershift gear is selected automatically. The other pairs of values in the table of FIG. 3 work analogously. The size of the interval for the brake pressure $p_{Brems}$ allocated to a particular starting gear to be selected, optionally enables a finer or coarser grading of the correlation.

The invention claimed is:

1. A method for operating a drive-train of a motor vehicle having a drive engine, a motor vehicle transmission and at least one drive axle, the method comprising:
   automatically separating a connection between the drive engine and the at least one drive axle of the motor vehicle by a function,
   actuating a service brake of the motor vehicle to activate the function,
   during a course of the function, triggered by a braking process, determining a brake pressure applied for the braking process, and
   automatically determining a starting gear as a function of the brake pressure.

2. The method according to claim 1, further comprising, if a first brake pressure limit value is exceeded, automatically overriding a pre-set starting gear selection.

3. The method according to claim 2, further comprising specifying, in addition to the first brake pressure limit value, at least a second brake pressure limit value which is higher than the first brake pressure limit value.

4. The method according to claim 1, further comprising visually indicating the starting gear determined as a function of the brake pressure.

5. The method according to claim 1, further comprising carrying out selection of the starting gear to be engaged when the speed of the vehicle is below a limit value.

6. The method according to claim 1, wherein the starting gear is determined for the motor vehicle transmission which is in the form of an automated synchronous transmission or a partially powershiftable transmission.

7. The method according to claim 1, further comprising detecting the brake pressure of at least one brake circuit of the service brake.

8. The method according to claim 1, further comprising carrying out a selection of the starting gear with reference to a correlation between brake pressures and group gears and powershift gears stored in a form of a table.

9. A control unit for a motor vehicle transmission arranged in a drive-train of a motor vehicle, which is connected to a first device for regulating a function for separating a connection between a drive engine and at least one drive axle of the motor vehicle, and a second device for automatic selection of a starting gear of the motor vehicle transmission, the function activated by the first device brings about a separation of the connection between the drive engine and the at least one drive axle of the motor vehicle, for the activation of the function a service brake of the motor vehicle has to be actuated, and, when the function that is triggered by a braking process is carried out, a brake pressure applied for the process is determinable and, as a function of the brake pressure, a starting gear is automatically determined, and for an automatic selection of the starting gear, a brake pressure of at least one brake circuit of the service brake must exceed a first brake pressure limit value in order for the starting gear to be determined as a function of the brake pressure.

10. The control unit according to claim 9, the control unit carrying out a method for operating the drive-train comprising:
    automatically separating the connection between the drive engine and the at least one drive axle of the motor vehicle by the function,
    actuating the service brake of the motor vehicle to activate the function,
    during a course of the function triggered by a braking process, determining the brake pressure applied for the braking process,
    automatically determining the starting gear based on the brake pressure, and
    automatically overriding a pre-set starting gear selection, if the first brake pressure limit value is exceeded.

11. The control unit according to claim 9 in combination with a computer program product for a control unit which carries out the method of operating the drive-train wherein a routine for activating the function by corresponding control commands stored in a software module is implemented, the method comprising:
    automatically separating the connection between the drive engine and the at least one drive axle of the motor vehicle by the function,
    actuating the service brake of the motor vehicle to activate the function,
    during a course of the function triggered by a braking process, determining the brake pressure applied for the braking process,
    automatically determining the starting gear as a function of the brake pressure, and
    automatically overriding a pre-set starting gear selection, if the first brake pressure limit value is exceeded.

12. The control unit according to claim 11, further comprising a data carrier with the computer program product.

13. A method of operating a drive-train of a motor vehicle having a drive engine, a motor vehicle transmission, at least one drive axle, the method comprising:
    initiating the method by actuating a service brake of the motor vehicle, when a drive connection between the drive engine and the at least one drive axle of the motor vehicle is disengaged,
    determining, via a pressure sensor, a braking pressure applied for actuating the service brake;
    automatically determining, via a transmission control unit, a starting gear of the transmission based on the determined braking pressure;
    selecting, via the transmission control unit, a pre-set starting gear if the determined braking pressure is less than or equal to a first pressure limit;
    selecting, via the transmission control unit, another starting gear if the determined braking pressure is greater than the first pressure limit and lower than or equal to a second brake pressure limit value;
    selecting, via the transmission control unit, a further starting gear if the determined braking pressure is greater than the second pressure limit; and
    engaging, via the transmission control device, the selected one of the pre-set starting gear, the another starting gear, and the further starting gear for starting the motor vehicle.

* * * * *